3,248,371
CROSS-LINKING BLOCKED TWO-STEP PREPOLYMER POLYURETHANE COATING COMPOSITIONS
Adolfas Damusis, Detroit, Mich., assignor to Wyandotte Chemicals Corporation, Wyandotte, Mich., a corporation of Michigan
No Drawing. Filed Mar. 10, 1961, Ser. No. 94,714
4 Claims. (Cl. 260—77.5)

This invention relates to novel coating compositions and more particularly to stable low temperature-curable polyurethane coating compositions containing blocked NCO-terminated intermediates.

In order to avoid the moisture instability of a one-component coating system and the difficulties of a two-component coating system, wherein the isocyanate-terminated intermediate and the material containing active hydrogen atoms remain separated until just prior to use, a procedure has been devised in the art for blocking the isocyanate groups. Blocking is simply a process in which the isocyanate group is reacted with a highly reactive material such as phenol. The use of a blocked isocyanate permits the isocyanate-terminated intermediate and the material containing active hydrogen atoms to be combined in a one-component system which is stable at room temperature. However, the one-component coating systems have the important disadvantage of requiring high curing temperatures in order to liberate the blocking agent and thus reactivate the —NCO groups to form stable urethane linkages with the polyol. This disadvantage becomes extremely important when the material desired to be coated is leather or other heat sensitive materials. Heretofore one-component coating systems containing blocked isocyanate-terminated intermediates could not be used to coat heat sensitive materials. Another disadvantage of one-component coating systems containing blocked isocyanate-terminated intermediates is the relatively long curing time required to obtain a stable coating.

Therefore it is an object of the present invention to provide a novel coating composition.

A further object is to provide a novel coating composition containing a blocked isocyanate-terminated intermediate.

Another object is to provide a novel coating composition containing a blocked isocyanate-terminated intermediate which is curable at lower temperatures and in shorter periods of time than prior coating compositions.

A still further object is to provide a coating process employing novel coating compositions containing a blocked isocyanate-terminated intermediate.

Other objects will become apparent hereinafter.

These and other objects are accomplished by the curable polyurethane coating compositions which comprise on the basis of 100% by weight about 25 to 100% of a blocked isocyanate-terminated polyether-based urethane intermediate wherein said polyether has a molecular weight of about 134 to 6,000, and a hydroxy tertiary amine deblocking agent selected from the group consisting of hydroxy tertiary amines and hydroxy-terminated tertiary nitrogen-containing polyether-based urethane intermediates, wherein the terminal NCO/OH ratio of said isocyanate-terminated polyether-based urethane intermediate to said deblocking agent is about 0.8 to 2.2, and about 0 to 75% of an inert solvent.

It has been discovered that by the incorporation of certain hydroxy tertiary amine compounds as the cross-linking agent in coating compositions containing blocked isocyanate-terminated intermediates, the blocked intermediates deblock at lower temperatures than when polyols consisting of carbon, hydrogen, and oxygen are employed. Thus, the incorporation of these hydroxy tertiary amines results in coatings having lower curing temperatures and shorter curing times. While primary and secondary amines have been found to deblock at lower temperatures they generally have the important disadvantage of short pot life in that they react with the blocked intermediate at room temperaure within a few minutes or hours in a one-component system. The hydroxy tertiary amines of this invention were discovered to lower curing temperatures and shorten curing time and found unexpectedly to have a long controllable pot life of several days when incorporated with a blocked NCO-terminated intermediate into a one-component system.

In order to demonstrate the invention more fully, a detailed description thereof appears below wherein the more important features are separately discussed.

DEBLOCKING AGENT

The hydroxy tertiary amine deblocking agents of the present invention are alkylene oxide adducts of tertiary amines and hydroxy-terminated tertiary nitrogen-containing polyether-based urethane intermediates. The hydroxy tertiary amines used as deblocking agents in this invention can be compounds encompassed by the formula:

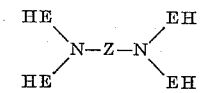

wherein Z is an alkylene radical containing from 2 to 6 carbon atoms, inclusive, wherein E is a polyoxyalklene chain which may be the same or different in each occurrence containing about 1 to 6 oxyalkylene groups and wherein the oxygen to carbon atom ratio of each oxyalkylene group is from about 0.25 to 0.50, which include, for example, N,N,N',N'-tetrakis(2-hydroxypropyl)ethylene diamine, N,N,N',N'-tetrakis(2-hydroxybutyl)ethylene diamine, N-mono(2-hydroxyethyl)-N,N',N'-tris(2-hydroxypropyl)ethylene diamine, N,N,N',N'-tetrakis(2-hydroxyethyl)ethylene diamine, addition product of 1 mol of N,N,N',N'-tetrakis(2-hydroxypropyl)ethylene diamine with 4 mols of ethylene oxide, addition product of 1 mol of N,N,N',N'-tetrakis(2-hydroxypropyl)ethylene diamine with a mixture of 8 mols of butylene oxide, 8 mols of propylene oxide and 4 mols of ethylene oxide, addition product of 1 mol of N,N,N',N'-tetrakis(2-hydroxypropyl)ethylene diamine with a mixture of 2 mols of ethylene oxide and 18 mols of propylene oxide, addition product of 1 mol of N,N,N',N'-tetrakis(2-hydroxypropyl)ethylene diamine with 4 mols of propylene oxide, addition product of 1 mol of N,N,N',N'-tetrakis-(2-hydroxypropyl)ethylene diamine with 1 to 20 mols of propylene oxide, addition product of 1 mol of N,N,N',N'-tetrakis(2-hydroxypropyl)ethylene diamine with 1 to 20 mols of butylene oxide, addition product of 1 mol of N,N,N',N'-tetrakis(2-hydroxypropyl)ethylene diamine with 4 mols of ethylene oxide, addition product of 1 mol of N,N,N',N'-tetrakis(2-hydroxypropyl)ethylene diamine with a mixture of 8 mols of butylene oxide and 8 mols of propylene oxide, addition product of 1 mol of N,N,N',N'-tetrakis(2-hydroxypropyl)ethylene diamine with 1 to 3 mols of propylene oxide and then with 1 mol of ethylene oxide, addition product of 1 mol of N,N,N',N' - tetrakis(2 - hydroxybutyl)ethylene diamine with 8 mols of propylene oxide and 8 mols of butylene oxide, addition product of 1 mol of N,N,N',N'-tetrakis-(2-hydroxypropyl)ethylene diamine with 4 to 16 mols of propylene oxide and then with 1 mol of ethylene oxide, the corresponding higher alkylene diamines such as N-mono(2 - hydroxyethyl)-N,N',N'-tris(2-hydroxypropyl)-propylene diamine, N,N,N',N'-tetrakis(2-hydroxypropyl)-propylene diamine, N,N,N',N'-tetrakis(2-hydroxybutyl)-propylene diamine, addition products of N,N,N',N'-tetrakis(2-hydroxypropyl)propylene diamine with from 1 to 20 mols of propylene oxide and the monoethylene oxide further addition products thereof, addition products of N,N,N',N'-tetrakis(2-hydroxypropyl)propylene diamine with a mixture of from 1 to 8 mols of propylene oxide and from 1 to 8 mols of butylene oxide and the monoethylene oxide further addition products thereof, addition products of N,N,N',N' - tetrakis(2 - hydroxybutyl)propylene diamine with from 1 to 8 mols of propylene oxide and 1 to 8 mols of butylene oxide and the monoethylene oxide further addition products thereof, the corresponding tetramethylene and hexamethylene diamines and the N,N,N',N' - tetrakis(2 - hydroxypropyl)tetramethylene and hexamethylene diamine mono through hexadeca-propylene oxide addition products thereof and such adducts further reacted with 1 mol of ethylene oxide, N,N,N',N'-tetrakis(2 - hydroxybutyl)tetramethylene and hexamethylene diamine mono through hexadeca-butylene oxide addition products thereof and such adducts further reacted with 1 mol of ethylene oxide and the like.

The hydroxy tertiary amines used as deblocking agents can also be compounds encompassed by the formula:

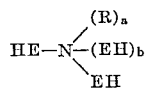

wherein E is a polyoxyalkylene chain which may be the same or different in each occurrence containing about 1 to 6 oxyalkylene groups and wherein the oxygen to carbon atom ratio of each oxyalkylene group is from about 0.25 to 0.50, wherein $a$ and $b$ are integers from 0 to 1, inclusive, and $a+b$ is 1, and wherein R is an alkyl radical containing about 1 to 8 carbon atoms, which include, for example, methyl diethanol amine, butyl dibutanol amine, propyl dipropanolamine addition product with a mixture of 2 mols of ethylene oxide, 4 mols of butylene oxide, and 4 mols of propylene oxide, triisopropanolamine addition product with a mixture of 3 mols of ethylene oxide and 12 mols of propylene oxide, ethyl diethanol amine addition product with 1 to 12 mols of butylene oxide, propyl diethanol amine addition product with 1 to 12 mols of propylene oxide, propyl diethanolamine addition product with a mixture of 5 mols of propylene oxide and 5 mols of butylene oxide, N-mono(ethanol) - N,N - di(isopropanol)amine, triisopropanolamine, triisobutanolamine, triisopropanolamine addition product with 1 mol of ethylene oxide, polyoxypropylene adduct of triisopropanolamine having a molecular weight of about 329, triisobutanolamine addition product with from 1 to 12 mols of propylene oxide, triisopropanolamine addition product with from 1 to 6 mols of propylene oxide and 1 to 6 mols of butylene oxide, triisopropanolamine addition product with 2 mols of propylene oxide and 1 mol of ethylene oxide, triisobutanolamine addition product with 2 mols of propylene oxide and 1 mol of ethylene oxide, triisobutanolamine addition product with a mixture of 5 mols of propylene oxide and 7 mols of butylene oxide, and triisopropanolamine addition product with 1 to 14 mols of propylene oxide and then with 1 mol of ethylene oxide, triisobutanolamine addition product with 1 to 8 mols of propylene oxide and 1 to 4 mols of butylene oxide and then with 1 mol of ethylene oxide and the like.

The hydroxy tertiary amines used as deblocking agents can also be compounds encompassed by the formula:

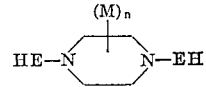

wherein E is a polyoxyalkylene chain which may be the same or different in each occurrence containing about 1 to 6 oxyalkylene groups and wherein the oxygen to carbon atom ratio of each oxyalkylene group is from about 0.25 to 0.50, wherein M is selected from hydrogen and methyl, and wherein $n$ is a number from 0 to 4, inclusive, which include, for example, 1,4-bis(2-hydroxybutyl)piperazine, 1,4-bis(2-hydroxypropyl)piperazine, 1-(2-hydroxyethyl)-4-(2-hydroxypropyl)piperazine, 1-(2-hydroxybutyl)-4-(2-hydroxypropyl)piperazine, 1,4-bis(2-hydroxypropyl)methylpiperazine, and also the corresponding dimethyl, trimethyl, and tetramethyl piperazines, 1,4-bis(2-hydroxybutyl)methylpiperazine, and also the corresponding dimethyl, trimethyl, and tetramethyl piperazines, 1-(2-hydroxyethyl)-4-(2 - hydroxypropyl)methylpiperazine, addition products of 1 mol of 1,4-bis(2-hydroxypropyl)methylpiperazine with 1 mol of ethylene oxide, addition products of 1,4-bis(2-hydroxypropyl)piperazine or a 1,4-bis(2-hydroxypropyl)methylpiperazine with from 1 to 8 mols of propylene oxide, addition products of 1,4-bis(2-hydroxypropyl)piperazine or a 1,4-bis-(2-hydroxypropyl)methylpiperazine with a mixture of 1 to 4 mols of propylene oxide and 1 to 4 mols of butylene oxide, 1,4-bis(2-hydroxyethyl)piperazine, addition products of 1,4-bis(2-hydroxypropyl)piperazine or a 1,4-bis-(2-hydroxypropyl)methylpiperazine with a mixture of 2 mols of ethylene oxide, 4 mols of propylene oxide and 4 mols of butylene oxide, addition products of 1,4-bis(2-hydroxypropyl)piperazine or a 1,4-bis(2-hydroxypropyl)methylpiperazine with a mixture of 4 mols of ethylene oxide and 4 mols of butylene oxide, addition products of 1,4-bis(2-hydroxypropyl)piperazine or a 1,4-bis(2-hydroxypropyl)methylpiperazine with a mixture of 5 mols of butylene oxide and 6 mols of propylene oxide, addition products of 1,4-bis(2-hydroxypropyl)piperazine or a 1,4-bis(2-hydroxypropyl)methylpiperazine with from 1 to 8 mols of butylene oxide, addition products of 1,4-bis-(2-hydroxypropyl)piperazine or a 1,4-bis(2-hydroxypropyl)methylpiperazine with from 1 to 4 mols of propylene oxide and 1 to 4 mols of butylene oxide and then with 1 mol of ethylene oxide and the like.

The hydroxy-terminated tertiary nitrogen-containing polyether-based urethane intermediates which may be used as the deblocking agent in the coating compositions of this invention include both products of the reaction of hydroxy tertiary amines and organic diisocyanates, which may be carried out either by reaction of a mixture of hydroxy tertiary amines and organic diisocyanates or by the sequential reaction of hydroxy tertiary amines with organic diisocyanates, and products of the reaction of hydroxy tertiary amines, polyether polymers and organic diisocyanates, which may be carried out either by reaction of a mixture of hydroxy tertiary amines, polyether polymers and diisocyanates or by the sequential reaction of hydroxy tertiary amines and polyether polymers with diisocyanates. The intermediates thus produced are long chain hydroxy-terminated nitrogen-containing polyether-based compositions.

The aforesaid hydroxy tertiary amines are employed in the reaction to produce the hydroxy-terminated tertiary nitrogen-containing polyether-based urethane intermediate deblocking agents. Representative of the organic diisocyanates which may be employed are m-phenylene diisocyanate, toluene-2,4-diisocyanate, hexamethylene-1,6-diisocyanate, tetramethylene-1,4-diisocyanate, cyclohexane-1,4-diisocyanate, naphthylene-1,5-diisocyanate, 1-methoxyphenyl-2,4-diisocyanate, diphenylmethane-4,4'-diisocyanate, 4,4'-biphenylene diisocyanate and mixtures thereof. The polyethers which may be employed in the reaction are polyether homopolymers, copolymers, or terpolymers of ethylene oxide, propylene oxide and/or butylene oxide. The polymer is the product of the sequential addition of ethylene oxide, propylene oxide and/or butylene oxide or mixtures thereof to a polyhydric alkanol until a polymer having a molecular weight of about 134 to 6,000 is produced. The polyhydric alkanol can be the polyether itself where its molecular weight is at least 134, such as dipropylene glycol.

The polyhydric alkanol employed in the preparation of the polyether polymers contains about 2 to 6 hydroxy groups and about 3 to 10 carbon atoms, for example propylene glycol, diethylene glycol, butane-1,4-diol, pentane-1,5-diol, hexane-1,3-diol, hexane-1,6-diol, glycerol, 1,1,1-trimethylolpropane, 1,1,1-trimethylolethane, hexane-1,2,6-triol, pentaerythritol and sorbitol.

Representative of the hydroxy-terminated tertiary nitrogen-containing polyether-based urethane intermediates is the product of mixing a hydroxy tertiary amine with an organic diisocyanate in the proportion of about 2:1 mols of hydroxy tertiary amine to diisocyanate at a temperature of about 20 to 100° C., the preferred range being 80 to 90° C., until a hydroxy-terminated adduct is obtained where in the hydroxy tertiary amine is of the formulae:

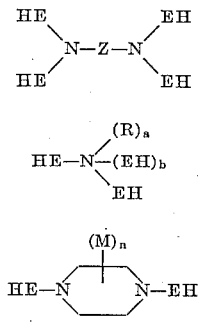

wherein E is a polyoxyalkylene chain which may be the same or different in each occurrence containing about 1 to 6 oxyalkylene groups and wherein the oxygen to carbon atom ratio of each oxyalkylene group is from about 0.25 to 0.50, wherein $a$ and $b$ are integers from 0 to 1, inclusive, and $a+b$ is 1, wherein R is an alkyl radical containing about 1 to 8 carbon atoms, wherein M is selected from hydrogen and methyl, and wherein $n$ is a number from 0 to 4, inclusive. The hydroxy-terminated tertiary nitrogen-containing polyether-based intermediate can also be the product of: first, mixing a polypropyleneether glycol with an organic diisocyanate in the proportion of about 1:2 mols of glycol to diisocyanate at a temperature of about 20 to 70° C., the preferred range being 50 to 60° C., until an isocyanate-terminated polypropyleneether glycol adduct is obtained; and second, mixing the isocyanate-terminated adduct with a hydroxy tertiary amine in the proportion of about 1:2 mols of adduct to polyol at a temperature of about 20 to 100° C., the preferred range being 80 to 90° C., until a hydroxy-terminated adduct is obtained. The polypropyleneether glycol should have a molecular weight between about 134 and 1,000, and the hydroxy tertiary amine is of the formulae:

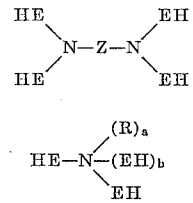

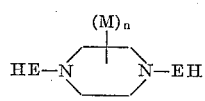

wherein E is a polyoxyalkylene chain which may be the same or different in each occurrence containing about 1 to 6 oxyalkylene groups and wherein the oxygen to carbon atom ratio of each oxyalkylene group is from about 0.25 to 0.50, wherein $a$ and $b$ are integers from 0 to 1, inclusive, and $a+b$ is 1, wherein R is an alkyl radical containing about 1 to 8 carbon atoms, wherein M is selected from hydrogen and methyl, and wherein $n$ is a number from 0 to 4, inclusive.

BLOCKED ISOCYANATE-TERMINATED INTERMEDIATES

The isocyanate-terminated intermediates which may be employed in the coating compositions of this invention are the product of the reaction of polyether polymers with diisocyanates. The reaction may be carried out either by reaction of a mixture of polyether polymers and organic diisocyanates or by the sequential reaction of polyether polymers with organic diisocyanates. Sequential reaction is necessary in some cases to prevent gelling caused by cross-linking during the reaction. The isocyanate-terminated reaction product is further reacted with a blocking agent such as phenol, cresol, ethyl acetyl acetate (diacetic ester), cyclohexanone oxime, or isopropanol to obtain the blocked isocyanate-terminated intermediate. The desired flexibility, impact and abrasion resistance, and solvent resistance of the coating can be obtained by proper control of the equivalent weight, chemical composition, and structure of the intermediates.

The polyether polymer is a homopolymer, copolymer, or terpolymer of ethylene oxide, propylene oxide, and/or butylene oxide. The polymer is the product of the sequential addition of ethylene oxide, propylene oxide, and/or butylene oxide or mixtures thereof to a polyhydric alkanol until a polymer having a molecular weight of about 134 to 6,000 is produced. The polyether may be the polyhydric alkanol itself where its molecular weight is at least 134.

The polyhydric alkanol employed in the preparation of the polyether polymers contains about 2 to 6 hydroxy groups and about 3 to 10 carbon atoms, for example propylene glycol, diethylene glycol, butane-1,4-diol, pentane-1,5-diol, hexane-1,3-diol, hexane-1,6-diol, glycerol, 1,1,1-trimethylolpropane, 1,1,1-trimethylolethane, hexane-1,2,6-triol, pentaerythritol, and sorbitol.

Representative of the typical organic diisocyanates which may be used in preparing the blocked isocyanate-terminated intermediates of this invention are m-phenylene diisocyanate, toluene-2,4-diisocyanate, hexamethylene-1,6-diisocyanate, tetramethylene-1,4-diisocyanate, cyclohexane-1,4-diisocyanate, naphthylene-1,5-diisocyanate, 1-methoxyphenyl-2,4-diisocyanate, diphenylmethane-4,4'-diisocyanate, 4,4'-biphenylene diisocyanate, and mixtures thereof.

A typical example of the blocked isocyanate-terminated intermediates which may be employed in the coating compositions of this invention is the product of a process which comprises: first, mixing a polyether polyol with an organic diisocyanate in the proportion of about 2:1 to 3:2, inclusive, mols of polyol to diisocyanate at a temperature of about 20 to 100° C., the preferred range being 80 to 90° C., until a hydroxy-terminated adduct having a substantially constant viscosity is obtained; second, mixing the hydroxy-terminated adduct with about 1 molar proportion of an organic diisocyanate for each hydroxy group of the said adduct at a temperature of about 20 to 70° C., the preferred range being 50 to 60° C., until an NCO-terminated adduct having a substantially constant viscosity is obtained; and third, mixing the NCO-terminated adduct with about 1 molar proportion of a blocking agent for each NCO group until a blocked NCO-terminated adduct is obtained. The polyether polyol of the reaction can be (a) a polypropylene ether glycol having a molecular weight between about 134 and 1,000 or (b) an alkylene oxide addition product of a polyhydric alkanol, said alkanol having at least 3 and not more than about 6 hydroxy groups and said addition product having on an average at least 1 and not more than 10 oxyalkylene groups per hydroxy group. In either case each oxyalkylene group contains about 2 to 4 carbon atoms. The blocking agent can be phenol, cresol, ethyl acetyl acetate (diacetic ester), cyclohexanone oxime or isopropanol. Another example is the product of the process which comprises: first, mixing a polyether polyol with about 1 molar proportion of an organic diisocyanate for each hydroxy group of said polyol at a temperature of about 20 to 70° C., the preferred range being 50 to 60° C., to produce an isocyanate-terminated adduct; second, mixing the isocyanate-terminated adduct with a polypropyleneether glycol in the proportion of about 2:1 mols of adduct to glycol at a temperature of about 20 to 100° C., the preferred range being 80–90° C., to produce a longer chain length NCO-terminated adduct; and third, mixing the NCO-terminated adduct with about 1 molar proportion of a blocking agent for each NCO group until a blocked NCO-terminated adduct is obtained. In this case the polyether polyol is an alkylene oxide addition product of a polyhydric alkanol, said alkanol having at least 3 and not more than 6 hydroxy groups and said addition product having on an average at least 1 and not more than 10 oxyalkylene groups per hydroxy group and each oxyalkylene group contains about 2 to 4 carbon atoms. The polypropyleneether glycol should have a molecular weight between about 134 and 1,000. The blocking agent can be phenol, cresol, ethyl acetyl acetate (diacetic ester), cyclohexanone oxime, or isopropanol.

The proportions of blocked isocyanate-terminated intermediate and hydroxy tertiary amine deblocking agent in the coating compositions may be varied over a wide range. The relative proportions of blocked isocyanate-terminated intermediate and hydroxy tertiary amine deblocking agent are related to the terminal NCO/OH ratio of the blocked isocyanate-terminated intermediate to the hydroxy tertiary amine deblocking agent. By terminal NCO is meant the NCO's to which the blocking agent is attached. However, reasonable limits on the NCO/OH ratio are from about 0.8 to 2.2.

SOLVENT

The solvents employed in the polyurethane coating compositions of this invention must be nonreactive to the blocked isocyanate-terminated urethane intermediates. They should be sufficiently low boiling that they will vaporize from the composition when coated onto a surface in a thin film. Many such solvents suitable in general for urethane coatings and components thereof are known in the art, for example, 2-ethoxyethyl acetate, 2-methoxyethyl acetate, 2-butoxyethyl acetate, toluene, xylene, ethyl acetate, butyl acetate, amyl acetate, other similar esters, ketones, chlorinated solvents, nitroaliphatic solvents, dioxane, and the like.

The proportion of solvent may be varied over a rather wide range. In some instances no solvent is required where a viscous or powdered coating composition is desired. Generally a 70% blocked isocyanate-terminated intermediate-hydroxy tertiary amine composition is a reasonable maximum considering that above this concentration the composition becomes very viscous or is a solid and becomes difficult to apply, thus making the formation of good homogeneous films difficult. A practical lower limit is about 25% solids (blocked isocyanate-terminated intermediate+hydroxy tertiary amine). Below this an unnecessary quantity of solvent is used and the films formed from lower concentrations are quite thin.

The coating process of this invention comprises applying the polyurethane coating compositions previously described to various surfaces by conventional means, such as brushing, spraying, dipping, passing a heated object through the powdered coating composition, or coating with a doctor blade and then curing the coating at an elevated temperature to form a cured coating on said surface. The curing temperature is directly related to the blocking agent employed and will vary. However, a reasonable curing temperature range is about 100 to 200° C. When phenol is employed as the blocking agent the coatings will cure at about 120–130° C. In general the coatings of this invention will cure at temperatures of about 20 to 30° C. lower than coating employing blocked isocyanate-terminated urethane intermediates and polyols, containing only carbon, hydrogen and oxygen, and in about one-half the curing time.

The following examples are presented to particularly illustrate the invention but should not be used to limit, unduly, the scope of the invention.

The molecular weights disclosed in the examples were calculated from the hydroxyl numbers of the compounds.

EXAMPLE 1

A series of urethane coating compositions was prepared containing a blocked isocyanate-terminated urethane intermediate and a hydroxy tertiary amine. The same blocked isocyanate-terminated urethane intermediate but a different hydroxy tertiary amine deblocking agent was employed in each composition. For comparison purposes, Coating No. 1 contains no deblocking agent and Coating No. 4 contains a hydroxy-terminated urethane intermediate containing no tertiary nitrogen. The coating properties of the compositions are presented in Table 1.

*Coating No. 1*

(A) Blocked isocyanate-terminated intermediate NCO–1–3D–Ph
(B) None

[Preparation of NCO-1-3D-Ph]

| Reactants | Molar proportions | | |
|---|---|---|---|
| | Mols | Parts | Weight percent |
| Polyoxypropylene derivatives of trimethylolpropane Pluracol TP–740 (M.W. 723) | 2 | 1,446 | 37.6 |
| Tolylene diisocyanate (1st portion) TDI (80/20; 2,4/2,6) | 1 | 174 | 4.5 |
| Tolylene diisocyanate (2d portion) | 4 | 696 | 18.0 |
| Phenol (1% excess) | 4 | 380 | 9.8 |
| Diethylcyclohexylamine 0.2% | | 4 | 0.1 |
| 2-ethoxyethyl acetate | | 576 | 15.0 |
| Toluene | | 576 | 15.0 |
| | | 3,852 | 100.0 |

Ratio of reactive groups NCO/OH=1.66:1.0.

*Procedure*

*Stage 1.*—Polyether polyols used in the reaction are preferably stripped of water by azeotropic distillation with benzene. In this manner, the amount of water can be decreased from 0.08–0.15 to 0.02% or even less.

174 parts of tolylene diisocyanate (TDI) were gradually added into a clean, dry, three-necked five-liter reaction flask containing 1446 parts of demoisturized Pluracol TP–740 with stirring. The temperature was kept below 90° C. by controlled addition of TDI to the Pluracol TP–740. After the exothermic reaction was finished the contents were heated at 80–90° C. and stirred for 3 hours. The abbreviated formula of the hydroxy-terminated intermediate at this stage is:

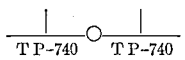

the circle representing the tolylene diisocyanate molecules, urethane linkages being omitted.

*Stage 2.*—Under a nitrogen blanket 696 parts of tolylene diisocyanate (TDI) were gradually added to hydroxy-terminated intermediate. The temperature was kept below 70° C. by controlled addition of TDI to the intermediate. After the exothermic reaction was finished the contents were heated at 60° C. and stirred for 2 hours. The abbreviated formula of the isocyanate-terminated intermediate at this stage is:

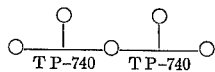

the circles representing the tolylene diisocyanate molecules, urethane linkages being omitted.

The isocyanate-terminated intermediate was diluted with 150 parts of 2-ethoxyethyl acetate and 150 parts of toluene to adjust the viscosity of the intermediate.

*Stage 3.*—Technical grade phenol used in the reaction was stripped of water by azeotropic distillation. 380 parts of phenol were diluted with a blend of 81 parts of 2-ethoxyethyl acetate and 81 parts of toluene to make a 70% phenol solution. The 70% solution plus 5% of benzene was charged into a distillation vessel and by azeotropic distillation the moisture was removed with the benzene.

The 70% phenol solution was cooled to 50° C. and added to the isocyanate-terminated intermediate along with 4 parts of diethylcyclohexylamine and heated for 2 hours at 80° C. The abbreviated formula of the blocked isocyanate-terminated intermediate at this stage is:

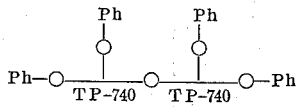

the circles representing the tolylene diisocyanate molecules, urethane linkages being omitted and Ph representing phenol.

The blocked isocyanate-terminated intermediate was diluted with 345 parts of 2-ethoxyethyl acetate and 345 parts of toluene to adjust the viscosity of the intermediate. The resulting solution was poured into a clean dry bottle and tightly capped.

[Properties of NCO–1–3D–Ph]

NCO/OH _____ 1.66/1.0
Average molecular weight (calc.) _____ 2684
Average equivalent weight per —NCO group, 100% solids _____ 671
Available NCO, percent _____ 6.28

[Properties of NCO–1–3D–Ph solution]

Average weight of solution per equivalent of NCO _____ 958
Percent available NCO, on soln. basis ____ 4.38
Brookfield viscosity at 25° C., cps. _____ 7,000–8,500

*Coating No. 2*

(A) Phenol blocked isocyanate-terminated intermediate NCO–1–3D–Ph
(B) Methyl diethanolamine

*Coating No. 3*

(A) Phenol blocked isocyanate-terminated intermediate NCO–1–3D–Ph
(B) Polyoxypropylene derivative of N,N,N′,N′-tetrakis (2 - hydroxypropyl)ethylene diamine having a molecular weight of 496 (P–111)

*Coating No. 4*

(A) Phenol blocked isocyanate-terminated intermediate NCO–1–3D–Ph (B) Hydroxy-terminated urethane intermediate OH–1 (contains no tertiary nitrogen, for comparison purposes)

[Preparation of OH–1]

| Reactants | Molar proportions | | |
|---|---|---|---|
| | Mols | Parts | Weight, percent |
| Polyoxypropylene derivative of trimethylolpropane, M.W. 411, Pluracol TP–440 | 2 | 3,288 | 66 |
| Tolylene diisocyanate, TDI (80/20; 2/4, 2/6) | 1 | 696 | 14 |
| 2-ethoxyethyl acetate | | 496 | 10 |
| Xylene | | 496 | 10 |
| | | 4,976 | 100 |

Ratio of reactive groups: NCO/OH=2/6=1/3.

*Procedure*

Polyether polyols used in the reaction are preferably stripped of water by azeotropic distillation with toluene. In this manner, the amount of water can be decreased from 0.08–0.15 to 0.02% or even less. A clean, dry, three-necked five-liter flask was used as a reaction vessel, and a nitrogen blanket was maintained over the reactants.

3288 parts of Pluracol TP–440 and 696 parts of tolylene diisocyanate were charged into a five-liter reaction flask and stirred gently. The temperature of the exothermic reaction rose to 60° C. The blend was kept at this temperature for at least one hour until the reaction stopped, whereafter 223 parts of 2-ethoxyethyl acetate and 223 parts of xylene were added in order to dilute the batch to 90% solids.

The temperature was then raised to 80° C. and the contents were heated for 3 hours with a gentle stirring. The viscosities were measured each hour.

Viscosity of the 90% batch reaches:

| | Gardner bubble | |
|---|---|---|
| | Viscosimeter readings | Centistokes |
| After 1st hour | V–Y | 800–1,760 |
| After 2d hour | Z–Z₁ | 2,270–2,700 |
| After 3d hour | Z₂–Z₄ | 3,390–6,340 |

273 parts of 2-ethoxyethyl acetate and 273 parts of xylene were added in order to dilute the batch to 80% solids. The contents were bottled. The abbreviated formula of the hydroxy-terminated intermediate is:

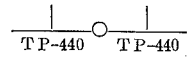

the circle representing the diisocyanate molecule, urethane linkages being omitted.

[Properties of OH–1]

NCO/OH _____ 1/3
Average molecular weight _____ 1000
Average equivalent weight _____ 250
Hydroxyl number _____ 224
Percent hydroxyl _____ 6.8

[Properties of OH–1 solution]

Average weight of soln. per OH equivalent ___ 1244
Nonvolatile, percent _____ 80
Weight per gallon, lb. _____ 8.78
Viscosity at 25° C., cps. _____ 500–2000

*Coating No. 5*

(A) Phenol blocked isocyanate-terminated intermediate NCO–1–3D–Ph (B) N,N,N',N' - tetrakis(2 - hydroxypropyl)ethylene diamine (Quadrol)

*Coating No. 6*

(A) Phenol blocked isocyanate-terminated intermediate NCO–1–3D–Ph
(B) Polyoxypropylene derivative of triisopropanol amine having a molecular weight of 456 (TIPA P–450)

The coating properties of the compositions are presented in Table II.

*Coating No. 1*

(A) Blocked isocyanate-terminated intermediate NCO–1–1T–Ph
(B) None

TABLE I.—PROPERTIES OF URETHANE COATINGS WITH NCO–1–3D PHENOL BLOCKED

| Coating No. | 1 | 2 | 3 | 4 | 5 | 6 |
|---|---|---|---|---|---|---|
| COMPOSITION | | | | | | |
| Phenol blocked isocyanate terminated intermediate. | NCO–1–3D–Ph | NCO–1–3D–Ph | NCO–1–3D–Ph | NCO–1–3D–Ph | NCO–1–3D–Ph | NCO–1–3D–Ph. |
| Parts by weight | 100 | 100 | 100 | 100 | 100 | 100. |
| Hydroxy tertiary amine deblocking agents except Nos. 1 and 4 for comparison purposes. | None | Methyl diethanol amine. | P–111 | OH–1 | Quadrol | TIPA P–450. |
| Parts by weight | | 5 | 9.3 | 36.8 | 5.5 | 11.4 |
| NCO/OH | | 1.2/1.0 | 1.2/1.0 | 1.2/1.0 | 1.2/1.0 | 1.2/1.0. |
| PROPERTIES | | | | | | |
| Curing temperature | 150° C | 120° C | 120° C | 120° C | 120° C | 130° C. |
| Curing time, hrs | 2 | 1 | 1 | 2 | 1 | 1. |
| Pot life | Indefinite | Over 3 days | Over 3 days | Over 2 mos | Over 2 days | Over 12 days. |
| Sward hardness | 70 | 66 | 72 | 46 | 70 | 54. |
| Elongation, percent | 30 | 40 | 18 | 10 | 12 | 60. |
| Tensile strength, p.s.i | 8,000 | 9,400 | 5,200 | 2,200 | 7,800 | 5,100. |
| Impact test, Gardner: | | | | | | |
| Direct (inch-lbs.) | >30 | >30 | 24 | 10 | 20 | >30. |
| Indirect (inch-lbs.) | 16 | >30 | 12 | 4 | 8 | >30. |
| Chemical resistance: | | | | | | |
| 20% NaOH | Excellent | Excellent | Excellent | Poor | Excellent | Excellent. |
| 20% HNO₃ | Sl. discoloration | Very good | Very good | do | Very good | Good. |
| Solvent resistance, hr.: | | | | | | |
| Toluene | >4 | >4 | >4 | ¼ | >4 | >4. |
| 2-ethoxyethyl acetate | >4 | >4 | >4 | ¼ | >4 | 3. |
| Water resistance: | | | | | | |
| 24 hrs. immersion, 25° C | No effect | No effect | No effect | Whitens | No effect | No effect. |
| ½ hr. immersion, 100° C | do | do | do | do | do | Do. |
| Weatherometer test, 500 hrs | No loss of gloss | No loss of gloss | No loss of gloss | Fails | No loss of gloss | No loss of gloss. |

Table I illustrates the superior properties of coatings employing hydroxy tertiary amines to those employing nonnitrogen-containing polyols when cured at low curing temperatures. Coatings Nos. 2, 3 and 5 were cured for 1 hour at 120° C., Coating No. 6 was cured for 1 hour at 130° C., and Coating No. 4 was cured for 2 hours at 120° C. Coating No. 1 was a fully cured coating cured for 2 hours at 150° C. used for comparison purposes. The results of the tests presented in Table I disclose that the properties of Coating Nos. 2, 3, 5 and 6, which contained hydroxy tertiary amines, were comparable or superior to the properties of Coating No. 1, which was a fully cured coating, and greatly superior to the properties of Coating No. 4, which contained a nonnitrogen-containing polyol. The properties indicate that Coatings Nos. 2, 3, 5 and 6 were adequately cured while the poor chemical resistance, solvent resistance, water resistance, and the Weatherometer test failure point out that Coating No. 4 was not adequately cured.

*Example 2*

A series of urethane coating compositions was prepared containing a different blocked isocyanate-terminated urethane intermediate and a hydroxy tertiary amine. The same blocked isocyanate-terminated urethane intermediate but a different hydroxy tertiary amine deblocking agent was employed in each composition. For comparison purposes Coating No. 1 contains no deblocking agent and Coating No. 4 contains a hydroxy compound containing no tertiary nitrogen.

[Preparation of NCO–1–1T–Ph]

| Reactants | Molar proportions | | |
|---|---|---|---|
| | Mols | Parts | Weight, percent |
| Polyoxypropylene derviatives of trimethylolpropane Pluracol TP–440 (M.W. 411) | 3 | 1,233 | 29.6 |
| Tolylene diisocyanate (1st portion) TDI (80/20; 2,4/2,6) | 2 | 348 | 8.30 |
| Tolylene diisocyanate (2d portion) | 5 | 870 | 20.80 |
| Phenol (1% excess) | 5 | 475 | 11.30 |
| Diethylcyclohexylamine (0.2%) | | 6 | .14 |
| 2-ethoxyethyl acetate | | 624 | 14.93 |
| Toluene | | 624 | 14.93 |
| | | 4,180 | 100.00 |

Ratio of reactive groups used in preparation of NCO intermediate NCO/OH=1.55/1.00.

*Procedure*

*Stage.*—Polyether polyols used in the reaction are preferably stripped of water by azeotropic distillation with benzene. In this manner, the amount of water can be decreased from 0.08–0.15 to 0.02% or even less.

384 parts of tolylene diisocyanate (TDI) were gradually added into a clean, dry, three-necked five-liter reaction flask containing 1233 parts of Pluracol TP–440 with stirring. The temperature was kept below 90° C. by controlled addition of TDI to the Pluracol TP–440. After the exothermic reaction was finished the contents were heated at 80–90° C. and stirred for 3 hours. The abbreviated formula of the hydroxy-terminated intermediate at this stage is:

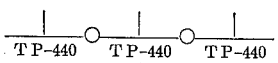

the circles representing the diisocyanate molecules, urethane linkages being omitted.

*Stage 2.*—Under a nitrogen blanket 870 parts of tolylene diisocyanate (TDI) were gradually added to the hydroxy-terminated intermediate. The temperature was kept below 70° by controlled addition of TDI to the intermediate. After the exothermic reaction was finished the contents were heated at 60° C. for 2 hours. Abbreviated formula of the isocyanate-terminated intermediate at this stage is:

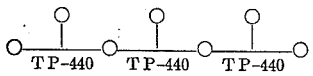

the circles representing the diisocyanate molecules, urethane linkages being omitted.

The isocyanate-terminated intermediate was diluted with 300 parts of 2-ethoxyethyl acetate and 300 parts of toluene to adjust the viscosity of the intermediate.

*Stage 3.*—Technical grade phenol used in the reaction was stripped of water by azeotropic distillation. 475 parts of phenol were diluted with a blend of 102 parts of 2-ethoxyethyl acetate and 102 parts of toluene to make a 70% phenol solution. The 70% solution plus 5% of benzene was charged into a distillation vessel and by azeotropic distillation the moisture was removed with the benzene.

The 70% phenol solution was cooled to 50° C. and added to the isocyanate-terminated intermediate along with 6 parts of diethylcyclohexylamine and heated for 2 hours at 80° C. The abbreviated formula of the blocked isocyanate-terminated intermediate at this stage is:

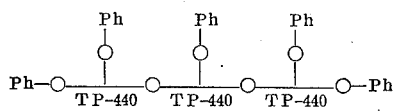

the circles representing the diisocyanate molecules, urethane linkages being omitted, and pH representing phenol.

The blocked isocyanate-terminated intermediate was diluted with 222 parts of 2-ethoxyethyl acetate and 222 parts of toluene to adjust the viscosity of the intermediate. The resulting solution was poured into clean dry bottle and tightly capped.

[Properties of NCO-1-1T-Ph]

| | |
|---|---|
| NCO/OH | 1.55/1.00 |
| Average molecular weight (calc.) | 2920 |
| Average equivalent weight per —NCO group, 100% solids | 584 |
| Available NCO, percent | 7.14 |
| Nonvolatile, percent | 70 |

[Properties of NCO-1-1T-Ph Solution]

| | |
|---|---|
| Average weight of solution per equivalent NCO | 834 |
| Percent available NCO, on soln. basis | 5.0 |
| Brookfield viscosity at 25° C., cps. | 8,000–10,000 |

Coating No. 2

(A) Phenol blocked isocyanate-terminated intermediate NCO-1-1T-Ph
(B) Methyl diethanolamine

Coating No. 3

(A) Phenol blocked isocyanate-terminated intermediate NCO-1-1T-Ph
(B) Hydroxy-terminated tertiary nitrogen-containing urethane intermediate OH-4-2

[Preparation of OH-4-2]

| Reactants | Molar proportions | | |
|---|---|---|---|
| | Mols | Parts | Weight percent |
| TDI (80/20; 2,4/2,6) | 1 | 522 | 11.2 |
| Polyoxypropylene derivative of N,N,N',N'-tetrakis(2-hydroxypropyl)-ethylene diamine (M.W. 524) P-111 | 2 | 3,144 | 68.8 |
| Cellosolve acetate (2-ethoxyethyl acetate) | | 457 | 10 |
| Xylene | | 457 | 10 |
| | | 4,580 | 100.0 |

Ratio of reactive groups NCO/OH=1/4.

Procedure

Polyether polyols used in the reaction are preferably stripped of water by azeotropic distillation with toluene. In this manner, the amount of water can be decreased from 0.08–0.15 to 0.02% or even less. A clean, dry, three-necked five-liter flask was used as a reaction vessel, and a nitrogen blanket was maintained over the reactants.

3144 parts of polyol P-111 and 522 parts of tolylene diisocyanate were charged into a five-liter reaction flask and stirred gently. The temperature of the exothermic reaction rose to 60° C. The blend was kept at this temperature for at least one hour until the reaction stopped, whereafter 203 parts of 2-ethoxyethyl acetate and 203 parts of xylene were added in order to dilute the batch to 90% solids.

The temperature was then raised to 80° C. and the contents were heated for 3 hours with a gentle stirring. The viscosities were measured each hour.

254 parts of 2-ethoxyethyl acetate and 254 parts of xylene were added in order to dilute the batch to 70% solids. The contents were bottled. The abbreviated formula of the hydroxy-terminated intermediate produced is:

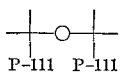

the circle representing the diisocyanate molecules, urethane linkages being omitted.

[Properties of OH-4-2]

| | |
|---|---|
| NCO/OH | ¼ |
| Average molecular weight | 1224 |
| Average equivalent weight | 204 |
| Hydroxyl number | 275 |
| Percent hydroxyl | 8.35 |

[Properties of OH-4-2 solution]

| | |
|---|---|
| Nonvolatile, percent | 80 |
| Weight per gallon, lb. | 8.7 |
| Viscosity at 25° C., cps. | 8,000–10,000 |
| Amount of solution per equivalence of OH, parts | 255 |

Coating No. 4

(A) Phenol blocked isocyanate-terminated intermediate NCO-1-1T-Ph
(B) Polypropylene ether glycol having a molecular weight of 420 (Pluracol P-410)

TABLE II.—PROPERTIES OF URETHANE COATINGS WITH NCO-1-1T PHENOL BLOCKED

| Coating No. | 1 | 2 | 3 | 4 |
|---|---|---|---|---|
| COMPOSITION | | | | |
| Phenol blocked isocyanate-terminated intermediate | NCO-1-1T-Ph | NCO-1-1T-PH | NCO-1-1T-Ph | NCO-1-1T-Ph. |
| Parts by weight | 100 | 100 | 100 | 100. |
| Hydroxy tertiary amine deblocking agents except Nos. 1 and 4 for comparison purposes | None | Methyl diethanol amine. | OH-4-2 | Pluracol P-410. |
| Parts by weight | | 7.7 | 36.4 | 19.4. |
| NCO/OH | | 1.2/1.0 | 1.2/1.0 | 1.2/1.0. |
| PROPERTIES | | | | |
| Curing temperature | 150° C | 120° C | 120° C | 140° C. |
| Curing time, hrs | 2 | 1 | 1 | 1. |
| Pot life | Indefinite | Over 48 hrs | Over 96 hrs | Over 3 mos. |
| Sward hardness | 74 | 70 | 76 | 52. |
| Elongation, percent | 10 | 20 | 16 | 10. |
| Tensile strength, p.s.i. | 8,400 | 9,000 | 8,200 | 2,100. |
| Impact test, Gardner: | | | | |
| Direct (inch-lbs.) | 20 | >30 | 26 | 16. |
| Indirect (inch-lbs.) | 8 | 24 | 16 | 6. |
| Chemical resistance: | | | | |
| 20% NaOH | Excellent | Excellent | Excellent | Poor. |
| 20% HNO₃ | Good | Very good | Very good | Darkens. |
| Solvent resistance, hr.: | | | | |
| Toluene | >4 | >4 | >4 | 1. |
| 2-ethoxyethyl acetate | >4 | >4 | >4 | ½. |
| Water resistance: | | | | |
| 24 hrs. immersion, 25° C | No effect | No effect | No effect | Whitens. |
| ½ hr. immersion, 100° C | do | do | do | Do. |
| Weatherometer test, 500 hrs | No loss of gloss | No loss of gloss | No loss of gloss | Fails. |

Table II illustrates the superior properties of coatings employing hydroxy tertiary amines to those employing nonnitrogen-containing polyols when cured at low curing temperatures. Coatings Nos. 2 and 3 were cured for 1 hour at 120° C. and Coating No. 4 was cured for 1 hour at 140° C. Coating No. 1 was a fully cured coating cured for 2 hours at 150° C. used for comparison purposes. The results of the tests presented in Table II disclose that the properties of Coatings 2 and 3, which contained hydroxy tertiary amines, were comparable or superior to the properties of Coating No. 1, which was a fully cured coating, and greatly superior to the properties of Coating No. 4, which contained a nonnitrogen-containing polyol. The properties indicate that Coatings Nos. 2 and 3 were adequately cured, while the poor chemical resistance, solvent resistance, water resistance, and the Weatherometer test failure point out that Coating No. 4 was not adequately cured.

EXAMPLE 3

A series of urethane coating compositions was prepared containing a different blocked isocyanate-terminated urethane intermediate and a hydroxy tertiary amine. The same blocked isocyanate-terminated urethane intermediate but a different hydroxy tertiary amine deblocking agent was employed in each composition. For comparison purposes Coating No. 1 contains no deblocking agent and Coating No. 4 contains a hydroxy compound containing no tertiary nitrogen.

The coating properties of the compositions are presented in Table III.

*Coating No. 1*

(A) Blocked isocyanate-terminated intermediate

NCO-5-2D-Ph (B) None

PREPARATION OF NCO-5-2D-PH

| Reactants | Molar proportions | | |
|---|---|---|---|
| | Mols | Parts | Weight percent |
| Polyoxypropylene diol Pluracol P-410 (M.W. 420) | 2 | 840 | 37.82 |
| Tolylene diisocyanate (1st portion) | 1 | 174 | 7.84 |
| Tolylene diisocyanate (2d portion) | 2 | 348 | 15.66 |
| Phenol (1% excess) | 2 | 190 | 8.55 |
| Diethylcyclohexylamine (0.2%) | | 3 | 0.13 |
| 2-Ethoxyethyl acetate | | 332 | 15.00 |
| Toluene | | 332 | 15.00 |
| | | 2,219 | 100.00 |

Ratio of reactive groups used in preparation of NCO intermediate NCO/OH=1.5:1.0.

*Procedure*

Same as used for NCO-1-3D—Ph in Example 1 except different reactants employed.

The abbreviated formula of the blocked isocyanate-terminated intermediate is:

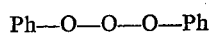

the circles representing the tolylene diisocyanate molecules, urethane linkages being omitted and Ph representing phenol.

[Properties of NCO-5-2D-Ph]

NCO/OH _____ 1.5/1.0
Average molecular weight (calc.) _____ 1546
Average equivalent weight per —NCO group, 100% solids _____ 773
Available NCO, percent _____ 5.43
Nonvolatile, percent _____ 70

[Properties of NCO-5-2D-Ph solution]

Average weight of solution per equivalent NCO ___ 1104
Percent available NCO, on soln. basis _____ 3.8
Brookfield viscosity at 25° C., cps. _____ 4,000–5,000

Coating No. 2

(A) Phenol blocked isocyanate-terminated intermediate NCO-5-2D-Ph
(B) Polyoxypropylene derivative of N,N,N',N'-tetrakis (2-hydroxypropyl)ethylene diamine having a molecular weight of 496 (Polyol P-111)

Coating No. 3

(A) Phenol blocked isocyanate-terminated intermediate NCO-5-2D-Ph
(B) Hydroxy-terminated tertiary nitrogen-containing urethane composition OH-4-2 (preparation and properties described in Example No. 2)

Coating No. 4

(A) Phenol blocked isocyanate-terminated intermediate NCO-5-2D-Ph
(B) Polyoxypropylene derivative of trimethylolpropane having a molecular weight of 411 (Pluracol TP-440)

EXAMPLE 4

A series of urethane coating compositions was prepared containing a different blocked isocyanate-terminated urethane intermediate and a hydroxy tertiary amine. The same blocked isocyanate-terminated urethane intermediate but a different hydroxy tertiary amine deblocking agent was employed in each composition. For comparison purposes Coating No. 1 contains no deblocking agent and Coatings Nos. 5 and 6 contain a hydroxy compound containing no tertiary nitrogen.

The coating properties of the compositions are presented in Table IV.

Coating No. 1

(A) Blocked isocyanate-terminated intermediate NCO-3-1-ph
(B) None

TABLE III.—PROPERTIES OF URETHANE COATINGS WITH NCO-5-2D PHENOL BLOCKED

| Coating No. | 1 | 2 | 3 | 4 | 5 |
|---|---|---|---|---|---|
| COMPOSITION | | | | | |
| Phenol blocked isocyanate-terminated intermediate | NCO-5-2D-Ph | NCO-5-2D-Ph | NCO-5-2D-Ph | NCO-5-2D-Ph | NCO-5-2D-Ph. |
| Parts by weight | 100 | 100 | 100 | 100 | 100. |
| Hydroxy tertiary amine deblocking agents except No. 1 and 4 for comparison purposes | None | Polyol P-111 | OH-4-2 | Pluracol TP-440 | TIPA P-350. |
| Parts by weight | | 9.4 | 21 | 10.2 | 9.0. |
| NCO/OH | | 1.2/1.0 | 1.2/1.0 | 1.2/1.0 | 1.2/1.0. |
| PROPERTIES | | | | | |
| Curing temperature | 160° C | 130° C | 130° C | 140° C | 130° C. |
| Curing time, hrs | 2 | 1 | 1 | 1 | 1. |
| Pot life | Indefinite | Over 12 days | Over 12 days | Over 3 mos | Over 24 days. |
| Sward hardness | 38 | 58 | 50 | 35 | 50. |
| Elongation, percent | 200 | 165 | 130 | 210 | 180. |
| Tensile strength, p.s.i. | 6,000 | 5,400 | 5,400 | 2,200 | 5,200. |
| Impact test-Gardner: | | | | | |
| Direct (inch-lbs.) | >30 | >30 | >30 | >30 | >30. |
| Indirect (inch-lbs.) | >30 | >30 | >30 | >30 | >30. |
| Chemical resistance: | | | | | |
| 20% NaOH | No effect | No effect | No effect | Yellow | No effect. |
| 20% HNO₃ | Dark discoloration. | Slight discoloration. | Very slight discoloration. | Dark discoloration. | Slight discoloration. |
| Solvent resistance, hr.: | | | | | |
| Toluene | 1 | >4 | >4 | ¼ | >4. |
| 2-ethoxyethyl acetate | ¼ | 3 | 3 | ¼ | 3. |
| Water resistance: | | | | | |
| 24 hrs. immersion, 25° C | Sl. whitening | No effect | No effect | Whitens, swells | No effect. |
| ½ hr. immersion, 100° C | Sl. whitening and softening. | do | do | do | Do. |
| Weatherometer test, 500 hrs | No loss of gloss | No loss of gloss | No loss of gloss | Fails | No loss of gloss. |

Coating No. 5

(A) Phenol blocked isocyanate-terminated intermediate NCO-5-2D-Ph
(B) Polyoxypropylene derivative of triisopropanol amine having a molecular weight of 353 (TIPA P-350)

Table III illustrates the superior properties of coatings employing hydroxy tertiary amines to those employing nonnitrogen-containing polyols when cured at low curing temperatures. Coatings Nos. 2, 3 and 5 were cured for 1 hour at 130° C. and Coating No. 4 was cured for 1 hour at 140° C. Coating No. 1 was a fully cured coating cured for 2 hours at 160° C. used for comparison purposes. The results of the tests presented in Table III disclose that the properties of Coatings Nos. 2, 3 and 5, which contained hydroxy tertiary amines, were comparable or superior to the properties of Coating No. 1, which was a fully cured coating, and greatly superior to the properties of Coating No. 4 which contained a nonnitrogen-containing polyol. The properties indicate that Coatings Nos. 2, 3 and 5 were adequately cured while the poor chemical resistance, solvent resistance, water resistance, and the Weatherometer test failure point out that Coating No. 4 was not adequately cured.

[Preparation of NCO-3-1-Ph]

| Reactants | Molar proportions | | |
|---|---|---|---|
| | Mols | Parts | Weight, percent |
| Polyoxypropylene derivative of trimethylolpropane Pluracol TP-440 (M.W. 411) | 2 | 822 | 18.50 |
| Polypropylene ether glycol (M.W. 420) | 1 | 420 | 9.4 |
| Tolylene diisocyanate (80/20; 2,4/2,6) | 6 | 1,044 | 23.46 |
| Phenol (1% excess) | 4 | 380 | 8.5 |
| Diethylcyclohexylamine (0.2%) | | 6 | .14 |
| 2-ethoxyethyl acetate | | 886 | 20 |
| Toluene | | 886 | 20 |
| | | 4,444 | 100.00 |

Ratio of reactive groups used in preparation of NCO intermediate NCO/OH=1.5/1.0.

Procedure

*Stage 1.*—Polyether polyols used in the reaction are preferably stripped of water by azeotropic distillation with benzene. In this manner, the amount of water can be decreased from 0.08–0.15 to 0.02% or even less.

1044 parts of tolylene diisocyanate (TDI) were charged into a five-liter reaction flask under a nitrogen blanket and 822 parts of Pluracol TP-440 gradually added thereto with stirring. The temperature is kept below 60° C. by cooling the vessel with cold water or by controlled addition of Pluracol TP-440 to the TDI. After the exothermic reaction was finished, the contents were heated at 60° C. for one hour while stirring. The isocyanate-terminated intermediate was diluted by the addition of 350 parts of 2-ethoxyethyl acetate and 350 parts of xylene to reduce the viscosity. The abbreviated formula of the isocyanate-terminated intermediate at this stage is:

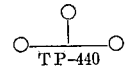

the circles representing the diisocyanate molecules, urethane linkages being omitted.

*Stage 2.*—420 parts of polypropylene ether glycol were gradually added to the isocyanate-terminated intermediate. The batch is heated to 80° C. for 3 hours, whereafter the reaction product was diluted with 120 parts of 2-ethoxyethyl acetate and 120 parts of xylene to adjust the viscosity before blocking. The isocyanate-terminated intermediate at this point has the abbreviated formula:

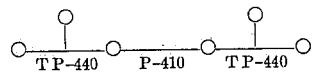

the circles representing the diisocyanate molecules, urethane linkages being omitted.

*Stage 3.*—Technical grade phenol used in the reaction was stripped of water by azeotropic distillation. 380 parts of phenol were diluted with a blend of 90 parts of 2-ethoxyethyl acetate and 90 parts of toluene to make a 70% phenol solution. The 70% solution plus 5% of benzene was charged into a distillation vessel and by azeotropic distillation the moisture was removed with the benzene.

The 70% phenol solution was cooled to 50° C. and added to the isocyanate-terminated intermediate along with 6 parts of diethylcyclohexylamine and heated for 2 hours at 80° C. The abbreviated formula of the blocked isocyanate-terminated intermediate at this stage is:

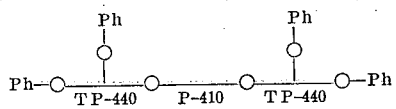

the circles representing the diisocyanate molecules, urethane linkages being omited, and Ph representing phenol.

The blocked isocyanate-terminated intermediate was diluted with 326 parts of 2-ethoxyethyl acetate and 326 parts of xylene to adjust the viscosity of the intermediate. The resulting solution was poured into a clean dry bottle and tightly capped.

[Properties of NCO-3-1-Ph]

| | |
|---|---|
| NCO/OH | 1.5/1.0 |
| Average molecular weight (calc.) | 2664 |
| Average equivalent weight per NCO group, 100% solids | 666 |
| Available NCO, percent | 6.3 |
| Nonvolatile, percent | 60 |

[Properties of NCO-3-1-Ph solution]

| | |
|---|---|
| Average weight of solution per equivalent NCO | 1105 |
| Percent available NCO, on solution basis | 3.8 |
| Brookfield viscosity | 3000–6000 |

*Coating No. 2*

(A) Phenol blocked isocyanate-terminated intermediate NCO-3-1-Ph
(B) Polyoxypropylene derivative of N,N,N′,N′-tetrakis-(2-hydroxypropyl)ethylene diamine having a molecular weight of 496 (polyol P-111)

*Coating No. 3*

(A) Phenol blocked isocyanate-terminated intermediate NCO-3-1-Ph
(B) Methyl diethanol amine

*Coating No. 4*

(A) Phenol blocked isocyanate-terminated intermediate NCO-3-1-Ph
(B) Hydroxy-terminated tertiary nitrogen-containing urethane intermediate OH-4-2 (preparation and properties described in Example No. 2)

*Coating No. 5*

(A) Phenol blocked isocyanate-terminated intermediate NCO-3-1-Ph
(B) Polyoxypropylene derivative of trimethylolpropane having a molecular weight of 411 (Pluracol TP-440)

*Coating No. 6*

(A) Phenol blocked isocyanate-terminated intermediate NCO-5-2D-Ph
(B) Polyoxypropylene derivative of trimethylolpropane having a molecular weight of 411 (Plurocal TP-440)

TABLE IV.—PROPERTIES OF URETHANE COATINGS WITH NCO-3-1 PHENOL BLOCKED

| Coating No. | 1 | 2 | 3 | 4 | 5 | 6 |
|---|---|---|---|---|---|---|
| COMPOSITION | | | | | | |
| Phenol Blocked Isocyanate-Terminated Intermediate | NCO-3-1-PH | NCO-3-1-PH | NCO-3-1-PH | NCO-3-1-PH | NCO-3-1-PH | NCO-3-1-PH. |
| Parts by weight | 100 | 100 | 100 | 100 | 100 | 100. |
| Hydroxy Tertiary Amine Deblocking Agents except No. 1, 5 and 6 for comparison purposes. | None | Polyol P-111 | Methyl diethanol amine. | OH-4-2 | Pluracol TP-440 | Pluracol TP-440. |
| Parts by weight | | 15.5 | 7.4 | 34.6 | 17 | 17. |
| NCO/OH | | 1.2/1.0 | 1.2/1.0 | 1.2/1.0 | 1.2/1.0 | 1.2/1.0. |
| PROPERTIES | | | | | | |
| Curing Temperature | 150° C | 120° C | 130° C | 120° C | 120° C | 150° C. |
| Curing Time, hrs | 2 | 1 | 1 | 1 | 1 | 2. |
| Pot life | Indefinite | Over 7 days | Over 5 days | Over 7 days | Over 3 mos. | Over 3 mos. |
| Sward hardness | 76 | 70 | 76 | 70 | 64 | 60. |
| Elongation, percent | 12 | 16 | 96 | 12 | 8 | 16. |
| Tensile strength, p.s.i. | 9,600 | 12,000 | 12,800 | 10,000 | 2,400 | 4,600. |
| Impact test, Gardner: | | | | | | |
| Direct (inch-lbs.) | >30 | >30 | >30 | >30 | 12 | >30. |
| Indirect (inch-lbs.) | 18 | 24 | >30 | 20 | 6 | 20. |
| Chemical Resistance: | | | | | | |
| 20% NaOH | No effect | No effect | No effect | No effect | Yellow | Good. |
| 20% HNO₃ | do | do | do | do | Discolors | Discolors |
| Solvent Resistance, hrs.: | | | | | | |
| 2-ethoxyethyl acetate | Over 72 | Over 72 | Over 72 | Over 72 | ¼ | 4. |
| | do | do | do | do | ¼ | 2. |
| Water Resistance: | | | | | | |
| 24 hrs. immersion, 25° C | No effect | No effect | No effect | No effect | Whitens, swells | No effect. |
| ½ hr. immersion, 100° C | do | do | do | do | do | Whitens. |
| Weatherometer test, 500 hrs | No loss of gloss | No loss of gloss | No loss of gloss | No loss of gloss | Fails | Loss of gloss. |

Table IV illustrates the superior properties of coatings employing hydroxy tertiary amines to those employing nonnitrogen-containing polyols, when cured at low curing temperatures.

Coatings Nos. 2, 4 and 5 were cured for 1 hour at 120° C., Coating No. 3 was cured for 1 hour at 130° C., and Coating No. 6 was cured for 2 hours at 150° C. Coating No. 1 was a fully cured coating cured for 2 hours at 150° C. used for comparison purposes.

The results of the tests presented in Table IV disclose that the properties of Coatings Nos. 2, 3 and 4, which contained hydroxy tertiary amines, were comparable or superior to the properties of Coating No. 1, which was a fully cured coating, greatly superior to the properties of Coating No. 5, and superior in some properties to Coating No. 6. Coatings 5 and 6 contained nonnitrogen-containing polyols. The properties indicate that Coatings Nos. 2, 3 and 4 were adequately cured and Coating No. 6 was almost cured, but the poor chemical resistance, solvent resistance, water resistance, and the Weatherometer test failure point out that Coating No. 5 was not adequately cured. A comparison of Coatings 5 and 6, which were prepared from the same coating composition, discloses the need for a higher curing temperature when nonnitrogen-containing polyols are employed.

EXAMPLE 5

A series of urethane coating compositions was prepared containing a different blocked isocyanate-terminated urethane intermediate and a hydroxy tertiary amine. The same blocked isocyanate-terminated urethane intermediate but a different hydroxy tertiary amine deblocking agent was employed in each composition. For comparison purposes Coating No. 1 contains no deblocking agent.

The coating properties of the compositions are presented in Table V.

*Coating No. 1*

(A) Blocked isocyanate-terminated intermediate NCO-1-4D-Ph
(B) None

[Preparation of NCO-1-4D-Ph]

| Reactants | Molar proportions | | |
|---|---|---|---|
| | Mols | Parts | Weight, percent |
| Polyoxypropylene derivative of pentaerythritol, 5 propylene oxide units/OH group (M.W. 1285) | 2 | 2,570 | 36.8 |
| Diphenylmethane-4,4'-diisocyanate (1st portion) | 1 | 250 | 3.6 |
| Diphenylmethane-4,4'-diisocyanate (2d portion) | 6 | 1,500 | 21.5 |
| Phenol (1% excess) | 6 | 570 | 8.15 |
| Diethylcyclohexylamine 0.2% | | 10 | .15 |
| 2-ethoxyethyl acetate | | 1,043 | 14.9 |
| Xylene | | 1,043 | 14.9 |
| | | 6,986 | 100.00 |

Ratio of the reactive groups NCO/OH=1.75/1.0.

*Procedure*

Same as used for NCO-1-3D-Ph in Example 1 except different reactants employed.

The abbreviated formula of the blocked isocyanate-terminated intermediate is:

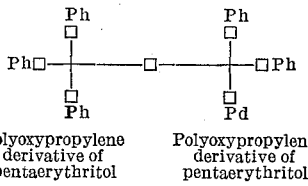

Polyoxypropylene derivative of pentaerythritol    Polyoxypropylene derivative of pentaerythritol the squares representing the diphenylmethane-4,4'-diisocyanate molecules, urethane linkages being omitted, and Ph representing phenol.

[Properties of NCO-1-4D-Ph]

| | |
|---|---|
| NCO/OH | 1.75/1.0 |
| Average molecular weight (calc.) | 4890 |
| Average equivalent weight per NCO group, 100% solids | 815 |
| Available NCO, percent | 5.15 |
| Nonvolatile, percent | 70 |

[Properties of NCO-1-4D-Ph solution]

| | |
|---|---|
| Average weight of solution per equivalent of NCO | 1116 |
| Percent available NCO, on soln. basis | 3.6 |
| Brookfield viscosity | 4000–7000 |

TABLE V.—PROPERTIES OF URETHANE COATINGS WITH NCO-1-4D PHENOL BLOCKED

| Coating No | 1 | 2 |
|---|---|---|
| COMPOSITION | | |
| Phenol blocked isocyanate-terminated intermediate | NCO-1-4D | NCO-1-4D. |
| Parts by weight | 100 | 100. |
| Hydroxy tertiary amine deblocking agents except No. 1 for comparison purposes | None | Oxypropylene derivative of DHP-MP. |
| Parts by weight | | 16. |
| NCO/OH | | 1.2/1.0. |
| PROPERTIES | | |
| Curing temperature | 160° C | 130° C. |
| Curing time, hrs | 1 | 1. |
| Pot life | Indefinite | Over 7 days. |
| Sward hardness | 86 | 84. |
| Elongation, percent | 20 | 36. |
| Tensile strength, p.s.i | 8,000 | 9,000. |
| Impact test, Gardner: | | |
|    Direct (inch-lbs.) | 26 | >32. |
|    Indirect (inch-lbs.) | 12 | 24. |
| Chemical resistance: | | |
|    20% NaOH | Excellent | Excellent. |
|    20% HNO₃ | Sl. discoloration | Very good. |
| Solvent resistance, hrs.: | | |
|    Toluene | Over 24 | Over 24. |
|    2-ethoxyethyl acetate | do | Do. |
| Water resistance: | | |
|    24 hrs. immersion, 25° C | No effect | No effect. |
|    ½ hr. immersion, 100° C | do | Do. |
| Weatherometer test, 500 hrs | No loss of gloss | No loss of gloss. |

23

*Coating No. 2*

(A) Phenol blocked isocyanate-terminated intermediate NCO-1-4D-Ph
(B) Polyoxypropylene derivative of 1,4-bis(2-hydroxypropyl)-2-methylpiperazine having a molecular weight of 432 (polyoxyalkylene derivative of DHP-MP)

Table V illustrates the fact that the properties of Coating No. 2 containing a hydroxy tertiary amine and cured for 1 hour at 130° C. are comparable to those of Coating No. 1 containing only a blocked isocyanate-terminated urethane intermediate but cured for 1 hour at 160° C. The chemical resistance, solvent resistance, water resistance, and Weatherometer tests point out that both coatings were adequately cured.

EXAMPLE 6

A series of urethane coating compositions was prepared containing a different blocked isocyanate-terminated urethane intermediate and a hydroxy tertiary amine. The same blocked isocyanate-terminated urethane intermediate but a different hydroxy tertiary amine deblocking agent was employed in each composition. For comparison purposes Coating No. 1 contains no deblocking agent.

The coating properties of the compositions are presented in Table VI.

*Coating No. 1*

(A) Blocked isocyanate-terminated intermediate NCO-3-4-Ph
(B) None

[Preparation of NCO-3-4-Ph]

| Reactants | Molar proportions | | |
|---|---|---|---|
| | Mols | Parts | Weight percent |
| Polyoxypropylene derivative of pentaerythritol, 5 propylene oxide units/OH group (M.W. 1285) | 2 | 2,570 | 25.1 |
| Diphenylmethane-4,4'-diisocyanate | 8 | 2,000 | 19.54 |
| Polypropylene ether glycol, P-1010 (M.W. 1000) | 1 | 1,000 | 9.8 |
| Phenol (1% excess) | 6 | 570 | 5.56 |
| Diethylcyclohexylamine 0.2% | | 12 | |
| 2-ethoxyethyl acetate | | 2,040 | 20.0 |
| Xylene | | 2,040 | 20.0 |
| | | 10,232 | 100.00 |

Ratio of the reactive groups NCO/OH=1.6/1.0.

24

*Procedure*

Same as used for NCO-3-1-Ph in Example 4 except different reactants employed.

The abbreviated formula of the blocked isocyanate-terminated intermediate is:

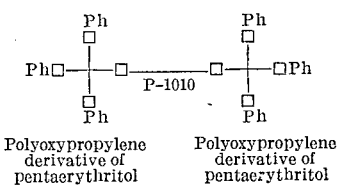

Polyoxypropylene derivative of pentaerythritol    Polyoxypropylene derivative of pentaerythritol the squares representing the diphenylmethane-4,4'-diisocyanate molecules, urethane linkages being omitted, and Ph representing phenol.

Properties of NCO-3-4-Ph

| | |
|---|---|
| NCO/OH | 1.60/1.0 |
| Average molecular weight (calc.) | 6140 |
| Average equivalent weight per NCO group, 100% solids | 1023 |
| Available NCO, percent | 4.10 |
| Nonvolatile, percent | 60 |

Properties of NCO-3-4-Ph solution

| | |
|---|---|
| Average weight of solution per equivalent of NCO | 1705 |
| Percent available NCO, on soln. basis | 2.46 |
| Brookfield viscosity | 4000-7000 |

*Coating No. 2*

(A) Phenol blocked isocyanate-terminated intermediate NCO-3-4-Ph
(B) Polyoxypropylene derivative of 1,4-bis(2-hydroxypropyl)-2-methylpiperazine having a molecular weight of 432 (polyoxyalkylene derivative of DHP-MP)

TABLE VI.—PROPERTIES OF URETHANE COATINGS WITH NCO-3-4 PHENOL BLOCKED

| Coating No. | 1 | 2 |
|---|---|---|
| COMPOSITION | | |
| Phenol Blocked Isocyanate-Terminated Intermediate | NCO-3-4 | NCO-3-4. |
| Parts by weight | 100 | 100. |
| Hydroxy Tertiary Amine Deblocking Agents except No. 1 for comparison purposes | None | Oxypropylene derivative of DHP-MP. |
| Parts by weight | | 9.2. |
| NCO/OH | | 1.2/1.0. |
| PROPERTIES | | |
| Curing Temperature | 160° C | 130° C. |
| Curing Time, hrs | 1 | 1. |
| Pot life | Indefinite | Over 7 days. |
| Sward hardness | 70 | 72. |
| Elongation, percent | 60 | 80. |
| Tensile strength, p.s.i | 6,000 | 6,800. |
| Impact test, Gardner: | | |
| Direct (inch-lbs.) | >32 | >32. |
| Indirect (inch-lbs.) | >32 | >32. |
| Chemical Resistance | | |
| 20% NaOH | Excellent | Excellent. |
| 20% HNO₃ | Sl. discoloration | Good. |
| Solvent Resistance, hrs.: | | |
| Toluene | Over 4 | Over 4. |
| 2-ethoxyethyl acetate | do | Do. |
| Water Resistance: | | |
| 24 hrs. immersion, 25° C | No effect | No effect. |
| ½ hr. immersion, 100° C | do | Do. |
| Weatherometer test, 500 hrs | No loss of gloss | No loss of gloss. |

Table VI illustrates the fact that the properties of Coating No. 2 containing a hydroxy tertiary amine and cured for 1 hour at 130° C. are comparable to those of Coating No. 1 containing only a blocked isocyanate-terminated urethane intermediate but cured for 1 hour at 160° C. The chemical resistance, solvent resistance, water resistance, and Weatherometer tests point out that both coatings were adequately cured.

EXAMPLE 7

A series of urethane coating compositions was prepared containing a different blocked isocyanate-terminated urethane intermediate and a hydroxy tertiary amine. The same blocked isocyanate-terminated urethane intermediate but a different hydroxy tertiary amine deblocking agent was employed in each composition. For comparison purposes Coating No. 1 contains no deblocking agent and Coating No. 3 contains a hydroxy compound containing no tertiary nitrogen.

The coating properties of the compositions are presented in Table VII.

*Coating No. 1*

(A) Block isocyanate-terminated intermediate

NCO-3-5-Ph (B) None

[Preparation of NCO-3-5-Ph]

| Reactants | Molar proportions | | |
|---|---|---|---|
| | Mols | Parts | Weight percent |
| Polyoxypropylene derivative of hexanetriol, 2 propylene oxide units/OH group (M.W. 482) | 2 | 964 | 21.4 |
| Phenylene diisocyanate | 6 | 936 | 20.76 |
| Polypropylene ether glycol, P-410 (M.W. 420) | 1 | 420 | 9.30 |
| Phenol (1% excess) | 4 | 380 | 8.42 |
| Diethylcyclohexylamine 0.2% | | 5.4 | 0.12 |
| 2-ethoxyethyl acetate | | 900 | 20.0 |
| Xylene | | 900 | 20.0 |
| | | 4,505.4 | 100.00 |

Ratio of the reactive groups NCO/OH=1.5/1.0.

*Procedure*

Same as used for NCO-3-1-Ph in Example 4 except different reactants employed.

The abbreviated formula of the blocked isocyanate-terminated intermediate is:

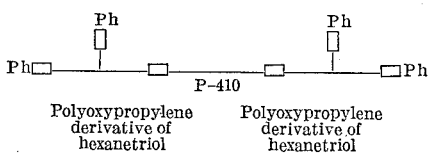

the rectangles representing the phenylene diisocyanate molecules, urethane linkages being omitted, and Ph representing phenol.

Properties of NCO-3-5-Ph
NCO/OH _____ 1.5/1.0
Average molecular weight (calc.) _____ 2700
Average equivalent weight per NCO group, 100% solids _____ 675
Available NCO, percent _____ 6.22
Nonvolatile, percent _____ 60

Properties of NCO-3-5-Ph solution
Average weight of solution _____ 1125
Percent available NCO, on soln. basis _____ 3.7
Brookfield viscosity _____ 4000–6000

*Coating No. 2*

(A) Phenol blocked isocyanate-terminated intermediate NCO-3-5-Ph (B) Polyoxypropylene derivative of N,N,N',N'-tetrakis-(2-hydroxypropyl)ethylene diamine having a molecular weight of 496 (P-111)

*Coating No. 3*

(A) Phenol blocked isocyanate-terminated intermediate NCO-3-5-Ph (B) Polypropylene ether glycol having a molecular weight of 420 (Pluracol P-410)

TABLE VII.—PROPERTIES OF URETHANE COATINGS WITH NCO-3-5 PHENOL BLOCKED

| Coating No | 1 | 2 | 3 |
|---|---|---|---|
| COMPOSITION | | | |
| Phenol blocked isocyanate terminated intermediate | NCO-3-5 | NCO-3-5 | NCO-3-5. |
| Parts by weight | 100 | 100 | 100. |
| Hydroxy tertiary amine deblocking agents except No. 1 and 3 for comparison purposes. | None | Polyol P-111 | Pluracol P-410. |
| Parts by weight | | 9.2 | 15.5. |
| NCO/OH | | 1.2/1.0 | 1.2/1.0. |
| PROPERTIES | | | |
| Curing temperature | 160° C | 130° C | 140° C. |
| Curing time, hrs | 1 | 1 | 1. |
| Pot life | Indefinite | Over 7 days | Over 3 mos. |
| Sward hardness | 68 | 66 | 36. |
| Elongation, percent | 20 | 40 | 10. |
| Tensile strength, p.s.i | 8,200 | 10,200 | 4,000. |
| Impact test, Gardner: | | | |
| Direct (inch-lbs.) | >30 | >30 | 12. |
| Indirect (inch-lbs.) | 18 | 24 | 6. |
| Chemical resistance: | | | |
| 20% NaOH | No effect | No effect | Discolors. |
| 20% HNO₃ | do | do | Do. |
| Solvent resistance, hrs.: | | | |
| Toluene | Over 24 | Over 24 | ½. |
| 2-ethoxyethyl acetate | do | do | ¼. |
| Water resistance: | | | |
| 24 hrs. immersion, 25° C | No effect | No effect | Whitens. |
| ½ hr. immersion, 100° C | do | do | Do. |
| Weatherometer test, 500 hrs | No loss of gloss | No loss of gloss | Fails. |

Table VII illustrates the superior properties of coatings employing hydroxy tertiary amines to those employing non-nitrogen-containing polyols when cured at low curing temperatures. Coating No. 2 was cured for 1 hour at 130° C. and Coating No. 3 was cured for 1 hour at 140° C. Coating No. 1 was a fully cured coating cured for 1 hour at 160° C. used for comparison purposes. The results of the tests presented in Table VII disclose that the properties of Coating No. 2, which contained a hydroxy tertiary amine, were comparable or superior to the properties of Coating No. 1, which was a fully cured coating and greatly superior to the properties of Coating No. 3, which contained a nonnitrogen-containing polyol. The properties indicate that Coating No. 2 was adequately cured while the poor chemical resistance, solvent resistance, water resistance, and the Weatherometer test failure point out that Coating No. 3 was not adequately cured.

A comparison of the coating properties of the coating compositions described in the examples points out the fact that coatings containing blocked isocyanate-terminated intermediates and polyols, containing carbon, hydrogen, and oxygen do not cure adequately at temperatures of 120–130° C. and require temperatures of 150–160° C. to adequately cure. However, the properties of the coatings point out that coating compositions containing tertiary hydroxy amine compounds adequately cure at 120–130° C. and require less curing time than do coating compositions employing conventional polyols curing at higher temperatures.

I claim:

1. A curable polyurethane coating composition which comprises on the basis of 100% by weight
   (A) about 25% to 100% of a mixture comprising
      (1) a blocked isocyanate-terminated polyether-based urethane intermediate wherein said polyether has a molecular weight of about 134 to about 6000, said intermediate being the product of a process which comprises: first, mixing a polyether polyol with an organic diisocyanate in the proportion of about 2:1 to 3:2, inclusive, moles of polyol to diisocyanate at a temperature of about 20° C. to 100° C. until a hydroxy-terminated adduct having a substantially constant viscosity is obtained; second, mixing the hydroxy-terminated adduct with about one molar proportion of an organic diisocyanate for each hydroxy group of the said adduct at a temperature of about 20° to 70° C. until an isocyanate-terminated adduct having a substantially constant viscosity is obtained; and third, mixing the isocyanate-terminated adduct with about one molar proportion of a blocking agent for each isocyanate group until a blocked isocyanate-terminated adduct is obtained, wherein said polyether polyol is a member selected from the group consisting of (a) polypropylene ether glycols having a molecular weight between about 134 and 1000 and (b) an alkylene oxide addition product of a polyhydric alkanol, said alkanol having about three to ten carbon atoms and at least three and not more than six hydroxy groups and said addition product having on an average at least one and not more than ten oxyalkylene groups per hydroxy group, and wherein each oxyalkylene group contains about two to four carbon atoms, and said blocking agent is a member selected from the group consisting of phenol, cresol, ethyl acetyl acetate (diacetic ester), cyclohexanone oxime, and isopropanol, and
      (2) a deblocking agent having two to four hydroxy groups selected from the group consisting of
         (a) hydroxy-terminated tertiary nitrogen-containing polyether-based intermediates prepared by, first, mixing a polypropyleneether glycol with an organic diisocyanate in the proportion of about 1:2 moles of glycol to diisocyanate at a temperature of about 20° C. to 70° C. until an isocyanate-terminated polypropyleneether adduct is obtained and, second, mixing the isocyanate-terminated adduct with a hydroxy tertiary amine in the proportion of about 1:2 moles of adduct to hydroxy tertiary amine at a temperature of about 20° C. to 100° C. until a hydroxy-terminated adduct is obtained, wherein said polypropyleneether glycol has a molecular weight between about 134 and 1000, and wherein said hydroxy tertiary amine is selected from the group consisting of compounds of the formulae:

(I) 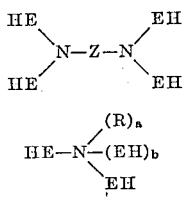

(II) 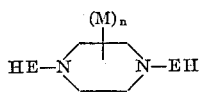

and (III)

HE—N⟨(M)ₙ⟩N—EH wherein E is a polyoxyalkylene chain containing about one to six oxyalkylene groups and wherein the oxygen to carbon atom ratio of each oxyalkylene group is from about 0.25 to 0.5; $a$ and $b$ are 0 or 1, the total of $a$ and $b$ being 1; R is an alkyl group containing from one to eight carbon atoms; Z is an alkylene radical containing from two to six carbon atoms; and M is hydrogen or methyl and $n$ is a number from 0 to 4, (b) hydroxy-terminated tertiary nitrogen-containing polyether-based intermediates prepared by mixing a hydroxy tertiary amine, as defined in subparagraph (a) above, with an organic diisocyanate in the proportion of about 2:1 moles of amine to diisocyanate at a temperature of about 20° C. to 100° C. until a hydroxy-terminated adduct is obtained, (c) hydroxy tertiary amines according to Formula I in subparagraph (a) above, (d) hydroxy tertiary amines according to Formula II in subparagraph (a) above, and (e) hydroxy tertiary amines according to Formula III in subparagraph (a) above, wherein the terminal NCO/OH ratio of said urethane intermediate to said deblocking agent is about 0.8 to 2.2, and (B) about 75% to 0% of an inert solvent.

2. The compositions of claim 1 wherein the deblocking agents are selected from the group consisting of
   (a) N,N,N′,N′ - tetrakis(2 - hydroxypropyl)ethylene diamine,
   (b) the four mole propylene oxide adduct of N,N,N′,N′-tetrakis(2-hydroxypropyl)ethylene diamine,
   (c) the four mole ethylene oxide adduct of N,N,N′,N′-tetrakis(2-hydroxypropyl)ethylene diamine,
   (d) the polyoxypropylene adduct of triisopropanolamine having a molecular weight of about 329, and
   (e) methyl diethanolamine.

3. A curable polyurethane coating composition which comprises on the basis of 100% by weight (A) about 25% to 100% of a mixture comprising
  (1) a blocked isocyanate-terminated polyether-based urethane intermediate wherein said polyether has a molecular weight of about 134 to about 6000, said intermediate being the product of a process which comprises: first, mixing a polyether polyol with about one molar proportion of an organic diisocyanate for each hydroxy group of said polyol at a temperature of about 20° C. to 70° C. to produce an isocyanate-terminted adduct; second, mixing the isocyanate-terminated adduct with a polypropyleneether glycol in the proportion of about 2:1 moles of adduct to glycol at a temperature of about 20° C. to 100° C. to produce a longer chain length isocyanate-terminated adduct; and, third, mixing the isocyanate-terminated adduct with about one molar proportion of a blocking agent for each isocyanate group until a blocked isocyanate-terminated adduct is obtained, wherein said polyether polyol is an alkylene oxide addition product of a polyhydric alkanol, said alkanol having about three to ten carbon atoms and at least three and not more than six hydroxy groups and said addition product having on an average at least one and not more than ten oxyalkylene groups per hydroxy group, and wherein each oxyalkylene group contains about two to four carbon atoms, wherein said polypropyleneether glycol has a molecular weight between about 134 and 1000, and wherein said blocking agent is a member selected from the group consisting of phenol, cresol, ethyl acetyl acetate (diacetic ester), cyclohexanone oxime, and isopropanol, and
  (2) a deblocking agent having two to four hydroxy groups selected from the group consisting of
    (a) hydroxy-terminated tertiary nitrogen-containing polyether-based intermediates prepared by, first, mixing a polypropyleneether glycol with an organic diisocyanate in the proportion of about 1:2 moles of glycol to diisocyanate at a temperature of about 20° C. to 70° C. until an isocyanate-terminated polypropyleneether adduct is obtained and, second, mixing the isocyanate-terminated adduct with a hydroxy tertiary amine in the proportion of about 1:2 moles of adduct to hydroxy tertiary amine at a temperature of about 20° C. to 100° C. until a hydroxy-terminated adduct is obtained, wherein said polypropyleneether glycol has a molecular weight between about 134 and 1000, and wherein said hydroxy tertiary amine is selected from the group consisting of compounds of the formulae:

(I) 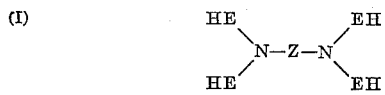

(II) 

and (III) 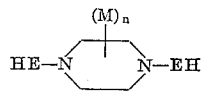

wherein E is a polyoxyalkylene chain containing about one to six oxyalkylene groups and wherein the oxygen to carbon atom ratio of each oxyalkylene group is from about 0.25 to 0.5; $a$ and $b$ are 0 or 1, the total of $a$ and $b$ being 1; R is an alkyl group conttaining from one to eight carbon atoms; Z is an alkylene radical containing from two to six carbon atoms; and M is hydrogen or methyl and $n$ is a number from 0 to 4,
    (b) hydroxy-terminated tertiary nitrogen-containing polyether-based intermediates prepared by mixing a hydroxy tertiary amine, as defined in subparagraph (a) above, with an organic diisocyanate in the proportion of about 2:1 moles of amine to diisocyanate at a temperature of about 20° C. to 100° C. until a hydroxy-terminated adduct is obtained,
    (c) hydroxy tertiary amines according to Formula I in subparagraph (a) above,
    (d) hydroxy tertiary amines according to Formula II in subparagraph (a) above, and
    (e) hydroxy tertiary amines according to Formula III in subparagraph (a) above,
  wherein the terminal NCO/OH ratio of said urethane intermediate to said deblocking agent is about 0.8 to 2.2, and
(B) about 75% to 0% of an inert solvent.
4. The compositions of claim 3 wherein the deblocking agents are selected from the group consisting of
  (a) N,N,N',N' - tetrakis(2 - hydroxypropyl)ethylene diamine,
  (b) the four mole propylene oxide adduct of N,N,N',N'-tetrakis(2-hydroxypropyl)ethylene diamine,
  (c) the four mole ethylene oxide adduct of N,N,N',N'-tetrakis(2-hydroxypropyl)ethylene diamine,
  (d) the polyoxypropylene adduct of triisopropanolamine having a molecular weight of about 329, and
  (e) methyl diethanolamine.

References Cited by the Examiner
UNITED STATES PATENTS

| | | | |
|---|---|---|---|
| 2,855,421 | 10/1958 | Burge | 260—77.5 |
| 2,871,266 | 1/1959 | McShane | 260—77.5 |
| 2,929,800 | 3/1960 | Hill | 260—77.5 |
| 2,935,487 | 5/1960 | Fox | 260—75 |
| 2,993,813 | 7/1961 | Tischbein | 260—77.5 |
| 3,049,513 | 8/1962 | Damusis | 260—77.5 |
| 3,049,514 | 8/1962 | Damusis | 260—77.5 |

FOREIGN PATENTS
848,965  9/1960  Great Britain.

OTHER REFERENCES
"Naming Indexing of Chemical Compounds," by Chem. Abstracts, pp. 46N, 47N and 89N, 1962.

LEON J. BERCOVITZ, *Primary Examiner.*

HAROLD N. BURNSTEIN, DONALD E. CZAJA,
*Examiners.*